United States Patent
Venkataraman et al.

(10) Patent No.: US 7,415,025 B1
(45) Date of Patent: Aug. 19, 2008

(54) METHOD AND APPARATUS FOR CLEARING A LARGE NUMBER OF CONNECTIONS IN AN ATM NETWORK

(75) Inventors: Lakshminarayanan Venkataraman, Sunnyvale, CA (US); ShuHung Alexander Mak, Fremont, CA (US); Cheng Chia Chu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 666 days.

(21) Appl. No.: 09/753,004

(22) Filed: Dec. 29, 2000

(51) Int. Cl.
*H04L 12/28* (2006.01)

(52) U.S. Cl. ............ 370/395.2; 370/395.3; 370/389; 370/400

(58) Field of Classification Search .......... 370/389, 370/395.1, 395.2, 395.21, 395.3, 395.31, 370/395.32, 396, 397, 398, 399
See application file for complete search history.

(56) References Cited

U.S. PATENT DOCUMENTS

| | | | |
|---|---|---|---|
| 4,800,488 A | 1/1989 | Agrawal et al. | |
| 5,090,011 A | 2/1992 | Fukuta et al. | |
| 5,128,932 A | 7/1992 | Li | |
| 5,313,454 A | 5/1994 | Bustini et al. | |
| 5,479,402 A * | 12/1995 | Hata et al. | 370/397 |
| 5,548,533 A | 8/1996 | Gao et al. | |
| 5,548,578 A | 8/1996 | Matsune et al. | |
| 5,600,798 A | 2/1997 | Cherukuri et al. | |
| 5,608,733 A * | 3/1997 | Vallee et al. | 370/394 |
| 5,703,870 A | 12/1997 | Murase | |
| 5,751,969 A | 5/1998 | Kapoor | |
| 5,831,973 A | 11/1998 | Yokotani et al. | |
| 5,835,484 A | 11/1998 | Yamato | |
| 5,898,691 A | 4/1999 | Liu | |
| 5,912,879 A | 6/1999 | Cha et al. | |
| 5,970,048 A | 10/1999 | Pajuvirta et al. | |
| 5,999,514 A * | 12/1999 | Kato | 370/231 |
| 5,999,532 A * | 12/1999 | Terasaki | 370/395.3 |
| 6,002,670 A * | 12/1999 | Rahman et al. | 370/238 |
| 6,032,188 A | 2/2000 | Mairs et al. | |
| 6,169,727 B1 | 1/2001 | Song | |
| 6,192,422 B1 | 2/2001 | Daines et al. | |
| 6,201,810 B1 | 3/2001 | Masuda et al. | |

(Continued)

OTHER PUBLICATIONS

The ATM Forum, "ATM User-Network Interface Specification, Version 3.0," pp. i-xxxi, 1-654 (Sep. 10, 1993).
The ATM Forum, "ATM User-Network Interface, Version 3.1 (UNI 3.1) Specification," Draft of May 28, 1994.

*Primary Examiner*—Bob A Phunkulh
(74) *Attorney, Agent, or Firm*—Blakely, Sokoloff, Taylor & Zafman LLP

(57) ABSTRACT

A method for clearing a plural number of connections from each of two connected nodes by clearing the first connection from the first node, generating a single first message from the first node to the second node identifying the connections, clearing the connections from the second node in response to the receipt of the first message, and generating a second message from the second node to the first node identifying the connections cleared by the second node in response to the second node receiving the first message. Furthermore, a node having circuits for generating and interpreting each of the two messages, and maintaining a database of connection status. Further, each of the two message types that signal a clearing of a plurality of inter-nodal connections.

25 Claims, 7 Drawing Sheets

U.S. PATENT DOCUMENTS

| | | |
|---|---|---|
| 6,252,870 B1 * | 6/2001 | Fraas et al. .................. 370/353 |
| 6,275,493 B1 * | 8/2001 | Morris et al. ............ 370/395.4 |
| 6,282,197 B1 * | 8/2001 | Takahashi et al. ........ 370/395.1 |
| 6,356,629 B1 | 3/2002 | Fourie et al. |
| 6,366,582 B1 * | 4/2002 | Nishikado et al. ........... 370/401 |
| 6,389,022 B1 * | 5/2002 | Jeong et al. ............... 370/395.2 |
| 6,424,620 B1 | 7/2002 | Nishihara |
| 6,427,161 B1 | 7/2002 | LiVecchi |
| 6,434,152 B1 * | 8/2002 | Yamamura ............... 370/395.2 |
| 6,442,140 B1 | 8/2002 | Kirschenbaum |
| 6,456,600 B1 | 9/2002 | Rochberger |
| 6,463,476 B1 | 10/2002 | Milles |
| 6,477,143 B1 | 11/2002 | Ginossar |
| 6,560,654 B1 | 5/2003 | Fedyk et al. |
| 6,563,809 B1 | 5/2003 | Proctor, Jr. et al. |
| 6,563,835 B1 * | 5/2003 | Chen .......................... 370/410 |
| 6,614,762 B1 | 9/2003 | Illiadis et al. |
| 6,615,264 B1 | 9/2003 | Stoltz et al. |
| 6,625,121 B1 | 9/2003 | Lau et al. |
| 6,674,721 B1 | 1/2004 | Dittia et al. |
| 6,690,653 B1 | 2/2004 | Anbiah et al. |
| 6,725,378 B1 | 4/2004 | Schuba et al. |
| 6,967,924 B1 | 11/2005 | Aimoto |
| 2002/0064130 A1 | 5/2002 | Siu et al. |

* cited by examiner

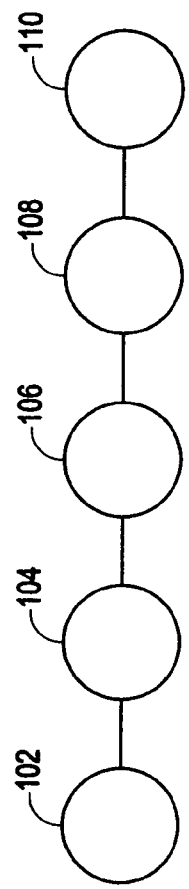
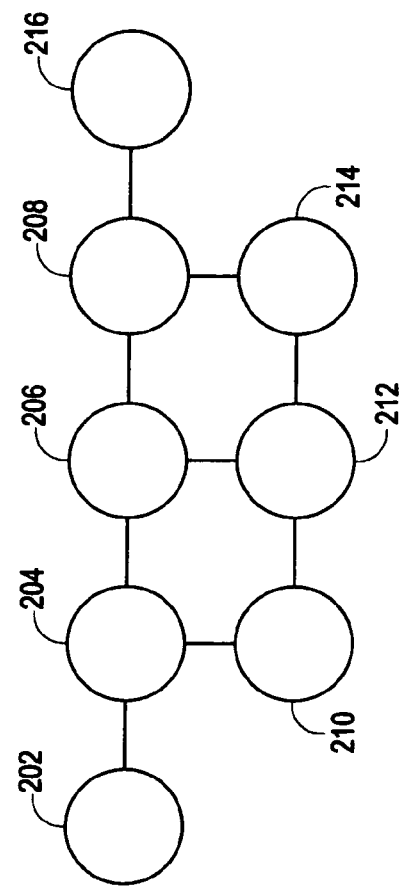

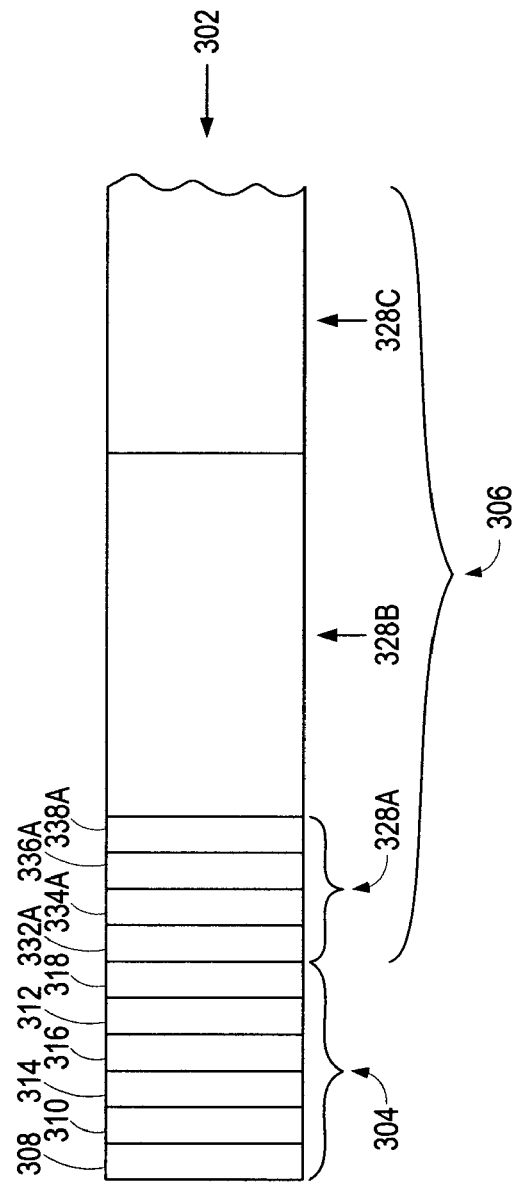
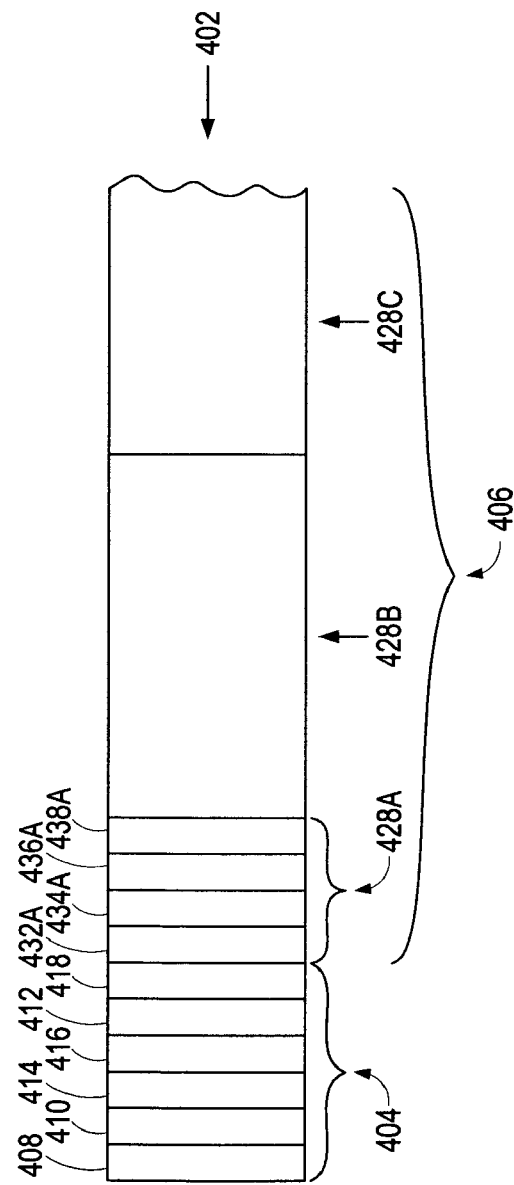

METHOD AND APPARATUS FOR CLEARING A LARGE NUMBER OF CONNECTIONS IN AN ATM NETWORK

FIELD OF THE INVENTION

The present invention relates generally to the field of Asynchronous Transfer Mode (ATM) data networks and more specifically to a method of and an apparatus for clearing connections in an ATM data channel.

BACKGROUND OF THE INVENTION

Asynchronous Transfer Mode (ATM) is a packet switching network technology based on switching fixed length packets of data between transmission devices, a transmission device (hereinafter referred to as a node) comprehending a gateway, a router, and a switch, and referred to alternatively as a node, or respectively as a gateway, router, or switch.

An ATM network typically provides a number of interconnected nodes which receive data from network nodes and forward that data through other network nodes to an ultimate destination. In general, a node includes a plurality of ports that are coupled to at least one input and output line, each port connecting the node to another node of the network, and allowing for the routing of data between the connecting nodes.

ATM based networks can maintain a large number of connections per port and the task of clearing (disconnecting) all connections of a port is inefficient using the ATM Forum provided prior art. In order to clear a Virtual Channel, the ATM Forum prior art provides a message called RELEASE and a corresponding message called RELEASE COMPLETE. Well known to those skilled in the art, the RELEASE and the RELEASE COMPLETE message are each transmitted along the signaling channel between connecting nodes. A first network node issues a separate RELEASE message for each connection, and transmits the RELEASE message to connecting nodes for propagation along the network for eventual reception by a second network node. The second network node then initiates and transmits a corresponding RELEASE COMPLETE message as an acknowledge to the RELEASE message for that separate connection that is transmitted across the network to the first network node.

With reference to FIG. 1, an ATM data pathway comprises a connected gateway 102, node 104, node 106, node 108, and gateway 110, and illustratively carries an established specific connection between gateway 102 and gateway 110. If a calling party (not shown) that is connected to gateway 102, chooses to initiate a disconnect process, the calling party transmits a disconnect message to gateway 102. Gateway 102 responds to the disconnect message by initiating a RELEASE message that is transmitted from gateway 102 across the pathway to gateway 110, which responds to the reception of the RELEASE message by transmitting to gateway 102 a corresponding RELEASE COMPLETE message for only that specific connection. The RELEASE COMPLETE message transmitted across the pathway individually releases the specific connection on gateway 110, the nodes 108, 106, and 104, and the gateway 102.

Now referring to FIG. 2, an ATM network 200 includes a router 202, nodes 204, 206, 208, 210, 212, 214, and router 216, comprising a separate transmission path 1 that includes router 202-node 204-node 206-node 208-router 216; and a separate transmission path 2 that includes router 202-node 204-node 210-node 212-node 214-node 208-router 216. Suppose that there are twenty established connections between router 202 and router 216 such that the ten connections take path 1, and a remaining ten connections take path 2. Now suppose that the trunk that connects node 204 and 206 is cut, so that each of the ten connections along path 1 should be released. Currently, according to ATM Forum prior art, node 204 must send ten separate RELEASE messages, one for each connection, towards router 202, and node 206 must send ten separate RELEASE messages towards router 216 via node 208, as both node 204 and node 206 sense the cable cut. Routers 202 and 216 each send back a separate RELEASE COMPLETE message for each of the separate ten connections. Or suppose that that the trunk that connects node 212 and node 214 is cut, so that each of the ten connections along path 2 should be released. Currently, according to ATM Forum prior art, node 212 must send ten separate RELEASE messages towards router 202 via nodes 210 and 204 and node 214 must send ten separate RELEASE messages towards router 216 via nodes 214 and 208 as both node 212 and node 214 sense the cable cut. Routers 202 and 216 each send back a separate RELEASE COMPLETE message for each of the separate ten connections.

As illustrated, because the current RELEASE and RELEASE COMPLETE messages together clear only a single connection, in order to clear a port all data connections at the port must be cleared separately by issuance of multiple RELEASE and RELEASE COMPLETE messages, one pair for each connection. If there is network congestion, a connection clearance in accordance with the ATM Forum prior art may require a retransmission. Thus a single connection, while requiring a minimum of two messages, may require more than two messages per connection, and a port having more than "n" connections while requiring a minimum 2 "n" messages, may require many more messages than that number. Each RELEASE and each RELEASE COMPLETE message consumes network resources including processor time, memory time, processor bus time, node transmission bus time, and node switch time; all of which impact overall node transmission bandwidth and hence network performance.

The prior art RELEASE and RELEASE COMPLETE messages consume "n" times the resources in clearing a port having "n" active connections by requiring "n" separate message pairs, than a disconnection method and apparatus that has only a single pair of clearing messages for all the port connections. Also, because the number of ATM layer 3 messages exchanged across ATM switches is significantly reduced (by a factor of 1/"n") for an ATM network by having 2 rather than 2 "n" messages, the cumulative task context switch time is reduced in an ATM switch processor. Also, the number of outstanding timers consuming node processor and memory time is reduced because only 1 timer is now required rather than n timers. The time for exchange of buffers between processor modules is also reduced. In a high-capacity ATM network, the reroute time is also reduced because the connections on a port can be disconnected by a single pair of messages, rather than a pair of messages for each individual connection. Also, the number of messages exchanged between nodes is reduced which reduces the congestion in a high capacity network. In a network comprising of large number of nodes, with a large number of connections (of the order of hundreds of thousand), to send/receive up to 4 messages per connection per node is an enormous burden on the network resources.

SUMMARY OF THE INVENTION

Briefly stated, a method is disclosed of clearing a plural number of connections from each of two connected nodes by clearing the first connections from the first node, generating a single first message from the first node to the second node identifying the connections, clearing the connections from the second node in response to the receipt of the first message, and generating a second message from the second node to the first node identifying the connections cleared by the second node in response to the second node receiving the first message. Additionally, a database is taught that maintains the connections cleared by the first node for which a first message type has been issued, as well as connections cleared by the first node for which a first message type has been issued and for which a second message type has not yet been received from the second node.

Briefly stated, an ATM node is disclosed having circuits for generating and interpreting each of the two messages, and maintaining a database of connection status. Each of the first and second message type signal a clearing of a plurality of inter-nodal connections. These messages each have an identification of the connections cleared/to be cleared, as well as a transaction identification, and an identification in the message of message type in a location consistent with an ATM message type.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements.

FIG. 1 portrays an embodiment of an ATM network having a single connection between two end points.

FIG. 2 portrays an embodiment of an ATM network having an illustrative ten connections along a first node path, and ten connections along a second node path.

FIG. 3 portrays an embodiment of the format of a BULK RELEASE message.

FIG. 4 portrays an embodiment of the format of a BULK RELEASE COMPLETE message.

DETAILED DESCRIPTION

Figure 5:
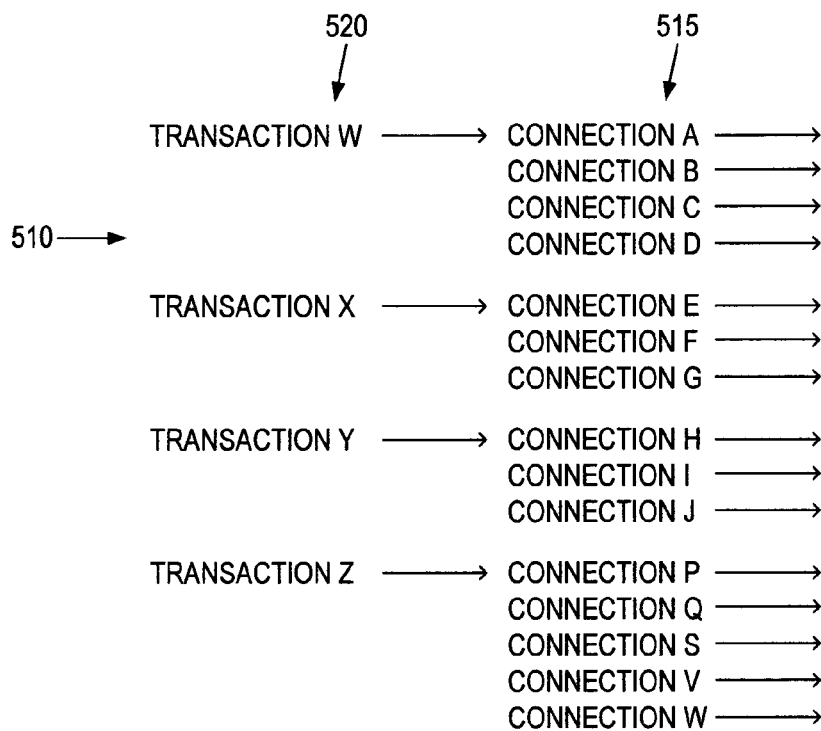
FIG. 5 portrays the structure of an embodiment of a connection database having connection records for connections included in a BULK RELEASE message.

In the following description, various aspects, configurations, and details of the present invention will be described. However, it will be apparent to those skilled in the art that the present invention may be practiced with only some or all aspects, configurations, and details of the description. In other instances, well known features are omitted or simplified, including apparatus and method steps, in order not to obscure the present invention. Various operations will be described as multiple discrete acts performed in turn in a manner that is most helpful in understanding the present invention. However, the order of description should not be construed as to imply that these operations are necessarily order dependent, in particular, the order the acts are presented. Any necessary ordering is alternatively expressly mentioned or will be understood by those skilled in the art. Furthermore, the phrases "in one embodiment" and/or "an embodiment" are used repeatedly. However the phrases do not necessarily refer to the same embodiment, although they may.

The present invention also relates to apparatus including circuits for performing the operations herein. This apparatus may be specially constructed for the required purposes, or it may include a general purpose computer selectively activated or reconfigured by a computer program stored in the computer. The method and apparatus taught herein are preferably implemented in software that is both stored on a node's conventional memory and executed on the node's conventional processor(s). It is also within the specific contemplation of this invention that the method and apparatus taught herein are implemented on a non-programmed digital circuit, including a finite state machine in whole or in part. Such a computer program may be stored in a computer readable storage medium. A machine readable storage medium includes any mechanism that provides (i.e. stores) information in a form readable by a machine (e.g. a computer). For example, a machine-readable medium includes read only memory (ROM), random access memory (RAM), magnetic disk storage media, optical storage media, flash memory devices, etc. The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A novel ATM layer 3 (or any other layer that may be responsible for clearing connections) message pair for signaling a clearing of at least one point-to-point connection between two specific nodes includes a first message that the inventors preferably term a BULK RELEASE (BR) message and a corresponding second message that the inventors preferably term a BULK RELEASE COMPLETE (BRC) message. The terms BULK RELEASE and BULK RELEASE COMPLETE shall be used in this description hereafter. These messages are preferably enabled and disabled using a configuration option, wherein each node has the support software already installed. On an ATM node, provisioning is preferably done using an IP connectivity into the node or alternatively through a console terminal. A command line interface command such as "cnfBulkRleaseFeature enable/disable" can be executed on the ATM node. After the command is executed, the option selected is stored in the ATM node database. Because the enablement and disablement is user configurable, the nodes are interoperable with non-BR/BRC nodes using ATM RELEASE and RELEASE COMPLETE messages.

Referring to FIG. 3, an embodiment of the BULK RELEASE message 302 includes an ATM User-to-Network Interface (UNI) formatted message. It is specifically contemplated that the number of connection records (Lists) transmitted by a BULK RELEASE message may be limited to less than the number of connections to be cleared on a port. In such case, it is specifically contemplated that a plural number of BULK RELEASE messages shall be issued and shall be exchanged between nodes in order to clear each plausible connection. While a specific preferred embodiment of a BULK RELEASE message is disclosed, the invention is specifically not dependant upon any specific embodiment of a BULK RELEASE message. The purpose of the BULK RELEASE message is to notify another network node that a clearance of specified connections is to occur or has occurred on a referenced node, and/or that a clearance of specified connections is to occur on the another node, and/or to provide the data for a confirming message to be issued by the another node, as well as to optionally provide the data to access the connection and transaction data in a memory, and to store data in the memory associated with the transaction and/or connection(s). Thus, a BULK RELEASE message should be in a format that will be distinguished and read by other network nodes, and should transmit the necessary information. There is no specific necessary embodiment of the BULK RELEASE message.

The BULK RELEASE message is generated by a node upon an initiating (or triggering) event as taught with reference to FIG. 7 below. The BR message includes a conventional message format having both a header 304 and a payload 306.

The BULK RELEASE message 302 header 304 includes a Protocol Discriminator record 308. The Protocol Discriminator record 308 content indicates whether or not the message is an ATM signaling CALL control message. The indication of this record is useful upon the receipt of the message and subsequent parsing for distinguishing a BR message from a non-call-control message that is exchanged between two adjacent ATM nodes. The BR message is a call-control message and the record content indicates a CALL control message. The preferred length of the Protocol Discriminator record 308 is 1 octet (an octet consisting of 8 bits). The header 304 includes a Transaction Identification record 310. The Transaction Identification record 310 content identifies a specific BR message and distinguishes between multiple BR messages sent from one node to a specific adjacent node. The preferred length of the Transaction Identification record 310 is 4 octets. The preferred format of this record is identical to the ATM Forum defined CALL REF. The header 304 includes a Message Identifier record 312. The Message Identifier record 312 content for a BR message is unique and thus the Message Identifier record 312 indicates unambiguously whether the message is or is not a BR message. For a BR message, the content of the Message Identifier record 312 indicates a BR message. The preferred length of the Message Identifier record 312 is 1 octet. The message Identifier record 312 is located in the header at the same position as an ATM Forum message format message type, so that a node that is BR/BRC enabled will read the record as a BR message, and accordingly parse and interpret the remainder of the message as a BULK RELEASE message, specifically parsing the Number of Lists record 318 (disclosed below) and treating the payload as a chain of lists, reading each field in the List, a list at a time. On the other hand, a node that is not BR/BRC enabled will find in the ATM Forum message format type element position an unknown message type, and will alternatively discard the message, generate a Status message to the sender, or some other null action.

The header 304 includes a Compatibility Instruction Indicator record 314. The Compatibility Instruction Indicator record 314 content indicates how to process the message as defined by the ATM Forum and understood by those skilled in the art. The preferred length of the Compatibility Instruction Indicator record 314 is 1 octet. The header 304 includes a Message Length record 316. The Message Length record 316 indicates the total message length excluding header size. The preferred length of the Message Length record 316 is 2 octets. The header 304 includes a Number of Lists record 318. The Number of Lists record 318 indicates the number of connection records carried in the BR message, termed by the inventors "Lists" as taught below with reference to FIG. 7. The construction and use of the Number of Lists record 318 is further taught with reference to FIG. 7. The preferred length of the Number of Lists record 318 is 2 octet.

The BULK RELEASE message 302 payload 306 includes at least one list record, where each separate list record 328$i$ is a record for a distinct connection "i", here portrayed as 3 list records 328$a$ through 328$c$ for respectively separate connections "a", "b", and "c". Each list record 328$i$ includes a Call Reference Length field not shown generally but only with reference to list record 328$a$ as 332$a$. The content of the Call Reference Length field 332$a$ specifies the maximum value of the field "Call Reference Value" disclosed presently. The value is preferably in bytes. Suppose it is 3 bytes. Therefore the Call Reference Value can range from 0 to 2 to the power of 3 times 8 bits, i.e. from 0 to 16,777 K. The preferred length of the Call Reference Length field is 1 octet. Each list record 328$i$ includes a Call Reference Value field not shown generally but only with reference to list record 328$a$ as 334$a$. The content of the Call Reference Value field 334$a$ specifies a unique identification for each connection between connecting nodes. Illustratively, in the network portrayed in FIG. 1, the content of the Call Reference Value field may be identified uniquely between gateway 102 and node 104 illustratively as 34, between node 104 and node 106 illustratively as 200, between node 106 and node 108 illustratively as 45, between node 108 and gateway 110 illustratively as 67. Thus the Call Reference Value field identifies a connection that goes between adjacent nodes. The preferred length of the Call Reference Value field is 3 octets. Each list record 328$i$ includes a Cause Location field not shown generally but only with reference to list record 328$a$ as 336$a$. The content of the Cause Location field 336$a$ specifies a coded categorization of connection clearing cause. The preferred length of the Cause Location field is 1 octet. Each list record 328$i$ includes a Cause Value field not shown generally but only with reference to list record 328$a$ as 338$a$. The Cause Value field 338$a$ indicates whether the connection clearing is to occur at the User side or the Network side. The preferred length of the Cause Value field is 1 octet.

Referring to FIG. 4, an embodiment of the BULK RELEASE COMPLETE message 402 includes an ATM User-to-Network Interface (UNI) formatted message. While a specific preferred embodiment of a BULK RELEASE COMPLETE message is disclosed within this patent, the invention is specifically not dependant upon any one specific embodiment of a BULK RELEASE COMPLETE message. The purpose of the BULK RELEASE COMPLETE message is to notify another network node that a clearance of specified connections is to occur or has occurred on a referenced node, in response to a BULK RELEASE message that has been received by the referenced node, as well as to optionally provide the data to access the connection and transaction data in a memory, and to store data in the memory associated with the transaction and or connection(s). Thus, a BULK RELEASE COMPLETE message should be in a format that will be distinguished and read by other network nodes, and should transmit the necessary information. There is no specific necessary embodiment of the BULK RELEASE COMPLETE message.

The BULK RELEASE COMPLETE message is generated by a node upon a receipt of a BULK RELEASE message and a clear of the connections to that node carried in the BULK RELEASE message, as taught with reference to FIG. 8 below. The BRC message includes a conventional message format having both a header 404 and a payload 406.

The BULK RELEASE COMPLETE message 402 header 404 includes a Protocol Discriminator record 408. The Protocol Discriminator record 408 content indicates whether or not the message is an ATM signaling CALL control message. The indication of this record is useful upon the receipt of the message and subsequent parsing for distinguishing a BRC message from a non-call-control message that is exchanged between two adjacent ATM nodes. THE BRC message is a call-control message and the record content indicates a CALL control message. The preferred length of the Protocol Discriminator record 408 is 1 octet. The header 404 includes a Correlation Identification record 410. The Correlation Identification record 410 content indicates a specific BRC message and is set equal to, by preferably copying back from, the Transaction Identification record 310 content of the received BR message (taught with reference to FIG. 3), that is a trigger of the necessary processing for generation of the BRC message. The Correlation Identification record 410 enables a receiver of the BRC message to identify that a particular BRC message is the response to a specific BR message (or that a particular transaction/connection(s) clearing in the BRC generating node is related to a particular transaction/connection (s) clearing in the BR generating node). The preferred length of the Correlation Identification record 410 is 4 octets and has a format identical to the ATM Forum defined CALL REF. The header 404 includes a Message Identifier record 412. The Message Identifier record 412 content for a BRC message is unique and thus the Message Identifier record 412 indicates unambiguously whether the message is or is not a BRC message. For a BRC message, the content of the Message Identifier record 412 indicates a BRC message. The preferred length of the Message Identifier record 412 is 1 octet. The message Identifier record 312 is located in the header at the same position as an ATM Forum message format message type, so that a node that is BR/BRC enabled will read the record as a BRC message, and accordingly parse and interpret the remainder of the message as a BULK RELEASE COMPLETE message. On the other hand, a node that is not BR/BRC enabled will find in the ATM Forum message format type element position an unknown message type, and will alternatively discard the message, generate a Status message to the sender, or some other null action.

The header 404 includes a Compatibility Instruction Indicator record 414. The Compatibility Instruction Indicator record 414 content indicates how to process the message as defined by the ATM Forum and understood by those skilled in the art. The preferred length of the Compatibility Instruction Indicator record 414 is 1 octet. The header 404 includes a Message Length record 416. The Message Length record 416 indicates the total message length excluding header size. The preferred length of the Message Length record 416 is 2 octets. The header 404 includes a Number of Lists record 418. The Number of Lists record 418 indicates the number of connection records carried in the BRC message, termed by the inventors "Lists" as taught below with reference to FIG. 8, as well as with reference to FIG. 7 for the BR message. The preferred length of the Number of Lists record 418 is 2 octet.

The BULK RELEASE COMPLETE message 402 payload 406 includes at least one list record, where each separate list record 428i is a record for a distinct connection "i", here portrayed as 3 list records 428a through 428c for separate connections "a", "b", and "c". Each list record includes separate fields. The preferred fields for the BULK RELEASE COMPLETE message 402 payload 406 are the fields Call Reference Length field (not shown generally but only with reference to list record 428a as 432a), the Call Reference Length field (not shown generally but only with reference to list record 428a as 432a), the Call Reference Value field (not shown generally but only with reference to list record 428a as 434a), the Cause Location field (not shown generally but only with reference to list record 428a as 436a), and the Cause Value field (not shown generally but only with reference to list record 428a as 438a). As taught with reference to FIG. 8, these four fields are each preferably set to the same content as the corresponding BULK RELEASE message record but it is specifically contemplated that the content of these four fields may be otherwise determined by the BULK RELEASE COMPLETE message generator, particularly if the node does not clear the same connections as the peer node generating the BR command. The content of the Call Reference Length field 432a specifies the maximum value of the field "Call Reference Value" disclosed presently. The value is preferably in bytes. Suppose it is 3 bytes. Therefore the Call Reference Value can range from 0 to 2 to the power of 3 times 8 bits, i.e. from 0 to 16,777 K. The preferred length of the Call Reference Length field is 1 octet. The content of the Call Reference Value field 434a specifies a unique identification for each connection between connecting nodes. Illustratively, in the network portrayed in FIG. 1, the Call Reference Value may be identified uniquely between gateway 102 and node 104 illustratively as 34, between node 104 and node 106 illustratively as 200, between node 106 and node 108 illustratively as 45, between node 108 and gateway 110 illustratively as 67. Thus the Call Reference Value field identifies a connection that goes between adjacent nodes. The preferred length of the Call Reference Value field is 3 octets. The content of the Cause Location field 436a specifies a coded categorization of connection clearing cause. The preferred length of the Cause Location field is 1 octet. The Cause Value field 438a indicates whether the connection clearing is to occur at the User side or the Network side. The preferred value of the Cause Value field is 1 octet.

Referring to FIG. 5, a node maintains a connection database for connections included in a BULK RELEASE message termed herein DS1 510. The criteria for deleting a connection record from the database DS1 510 is dependant upon design considerations of a specific network, and will be well known to those skilled in the art. The database DS1 510 facilitates the generation and processing of both the BULK RELEASE and the BULK RELEASE COMPLETE message. The database DS1 510 maintains a record of relevant connection data for each connection for which a BULK RELEASE message has been generated. The database DS1 510 preferably has the Call Reference Value 515 that uniquely identifies each connection for a quantity of connections determined by the Call Reference Value 515 bit length, and taught with reference to the content of the Call Reference Value field 334a, as the key data base index. Moreover, preferably each call reference 515 is associated with the BR message that transmitted its node clearance, preferably the Transaction Identification 520 that uniquely identifies each separate BR message for a quantity of BR messages determined by the Transaction Identification 520 bit length, and taught with reference to the content of the Transaction Identification record 310, as a data base root.

Figure 6:
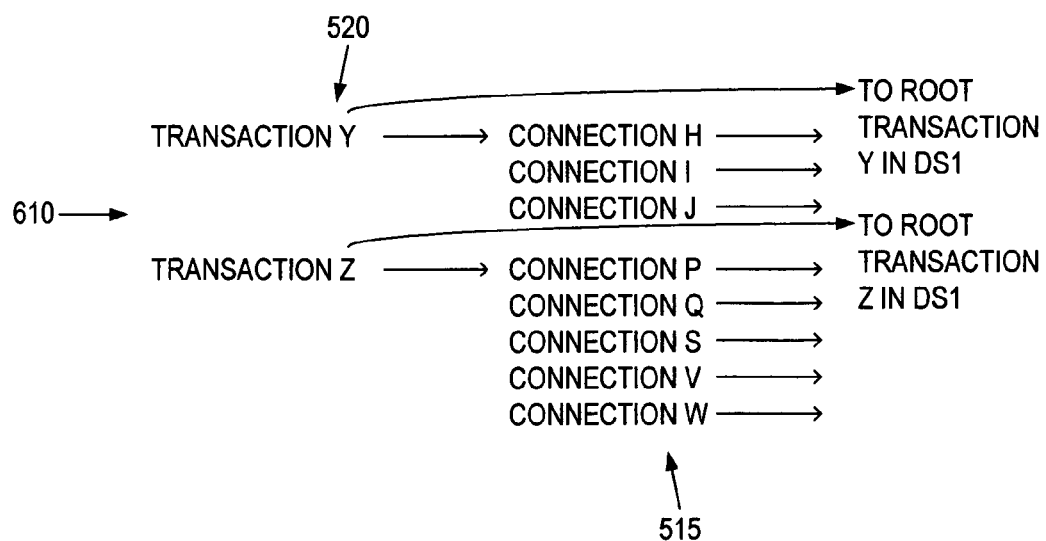
FIG. 6 portrays the structure of an embodiment of a connection database having connection records for connections for which a BULK RELEASE message has been generated but for which a BULK RELEASE COMPLETE message has not yet received.

Referring to FIG. 6, a node maintains a connection database for connections included in a BULK RELEASE message for which a BR message has been generated but for which a BULK RELEASE COMPLETE MESSAGE has not yet been received (and processed by the software that maintains the database), termed herein DS2 610. The database DS2 preferably has the Transaction Identification 520 as the key data base index, taught with reference to FIG. 5. The record corresponding to each Transaction Identification 520 in database DS2 610 preferably points to the root of the database DS1 710 (portrayed with reference to FIG. 5) that contains all the connection references (preferably the Call Reference Value 515) sent in a BULK RELEASE message having the same Transaction Identification 520. Referring now to both FIG. 5 and FIG. 6, The preferred database organization of DS1 510 and DS2 610 is efficient for searching and processing call records when a BRC message is received. The maximum depth of DS1 510 is log 2(N) and the maximum depth of DS2 610 is log 2(N/n), where "N" is the maximum number of connections allowed in the node at a time, and "n" is the number of call references included in a BR message.

Figure 7:
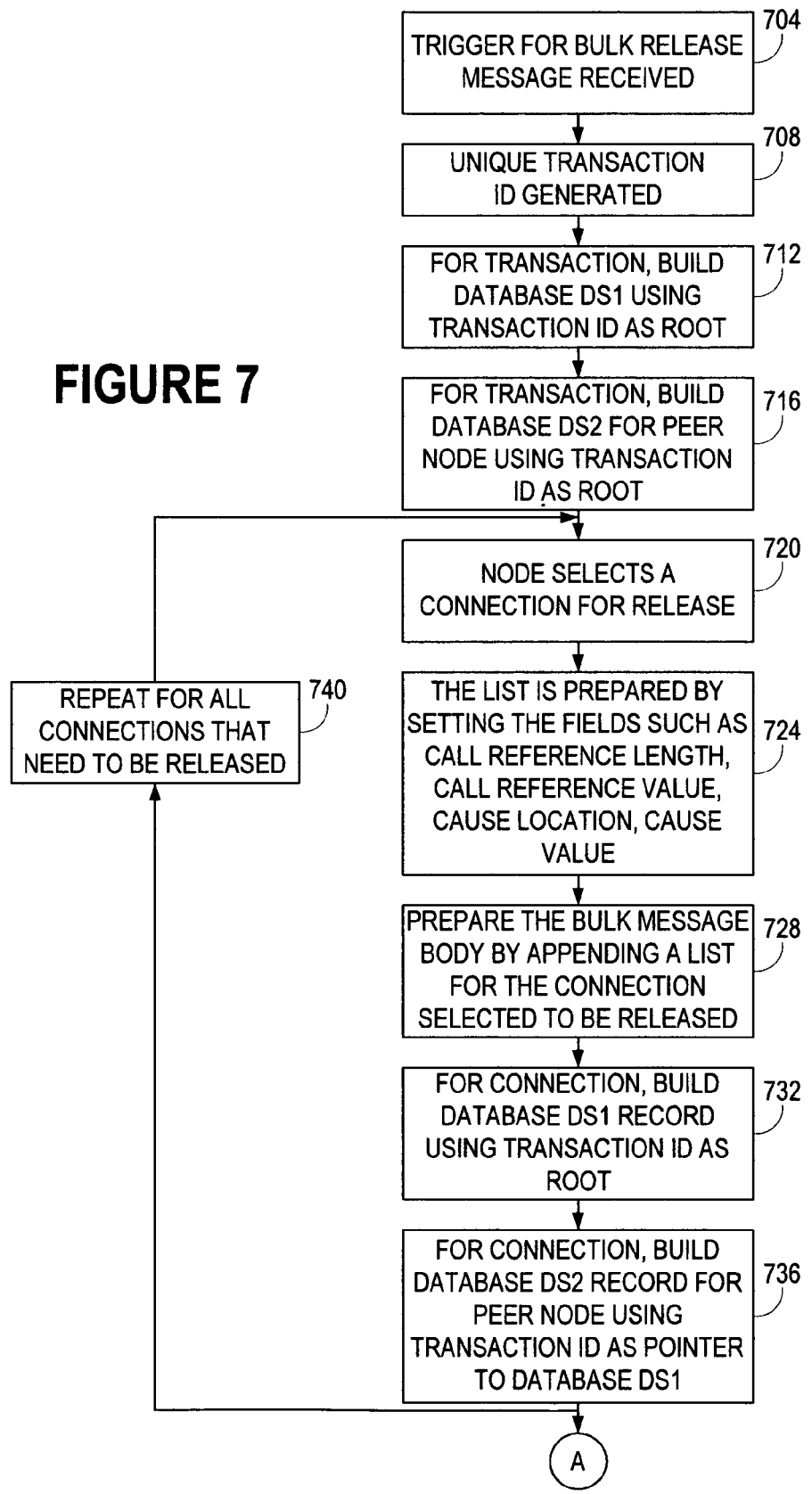
FIG. 7 portrays a flow chart of an embodiment of a method of clearing the connections on a node that connect to a peer node, generating a BULK RELEASE message to the peer node, sending the BULK RELEASE message to the peer node, and updating a connection database for the single transaction. The order of description should not be construed as to imply that these operations are necessarily order dependent.
Figure 7:
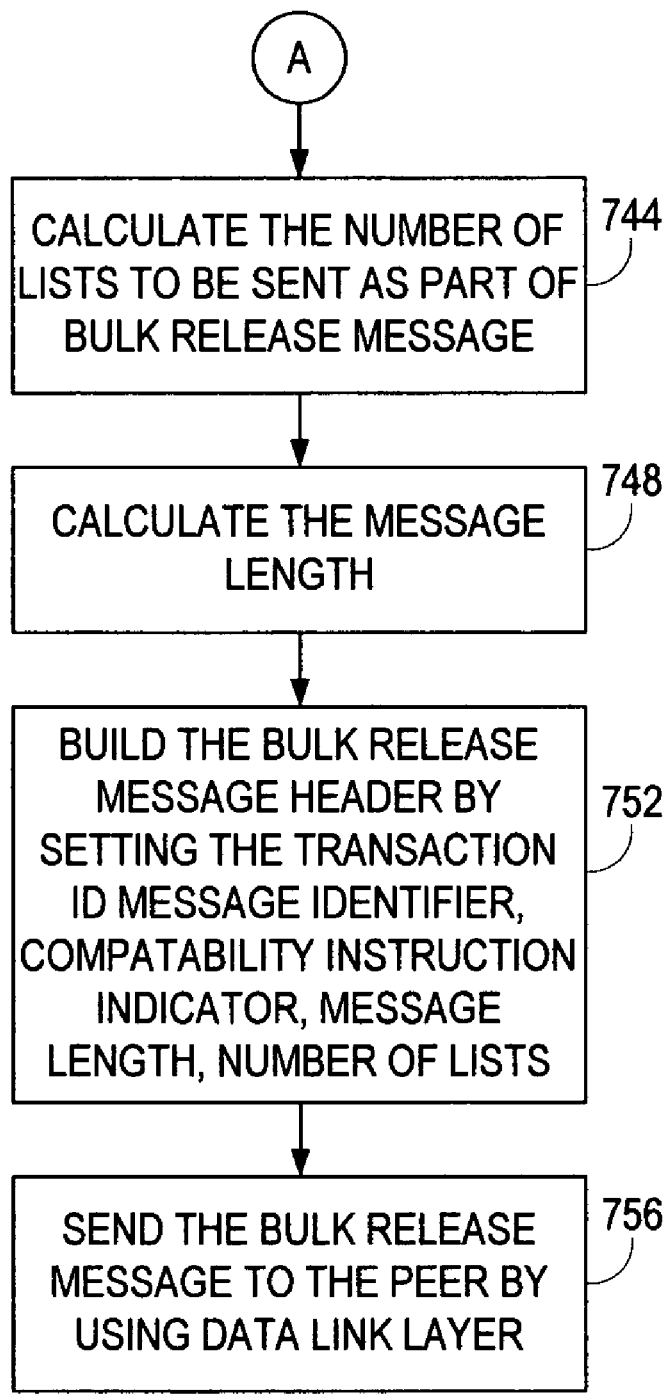
Figure 8:
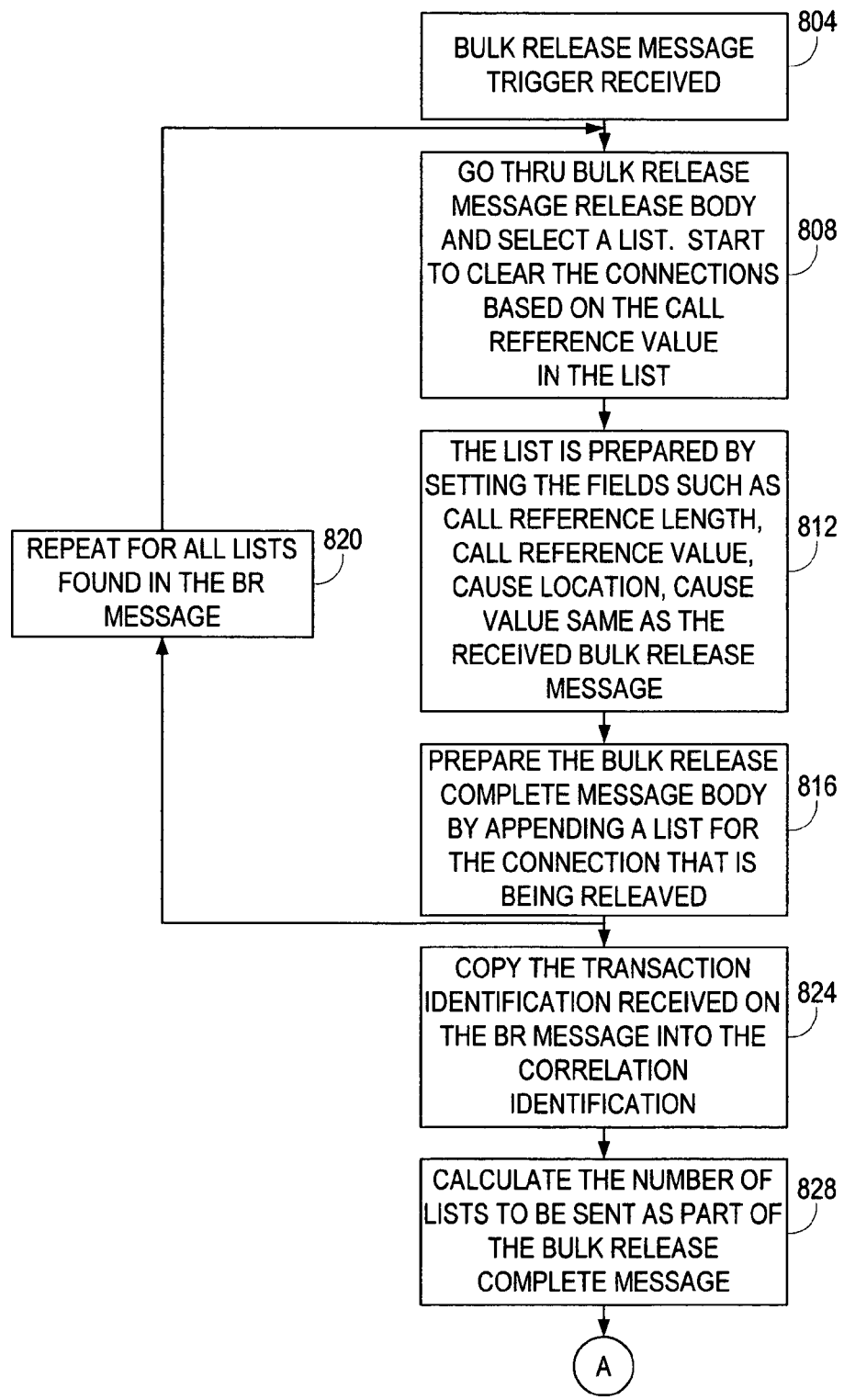
FIG. 8 portrays a flow chart of an embodiment of a method of clearing the connections on a node that connect to a per node, generating a BULK RELEASE COMPLETE message to the peer node, sending the BULK RELEASE COMPLETE message to the peer node, and updating a connection database for the single transaction. The order of description should not be construed as to imply that these operations are necessarily order dependent.
Figure 8:
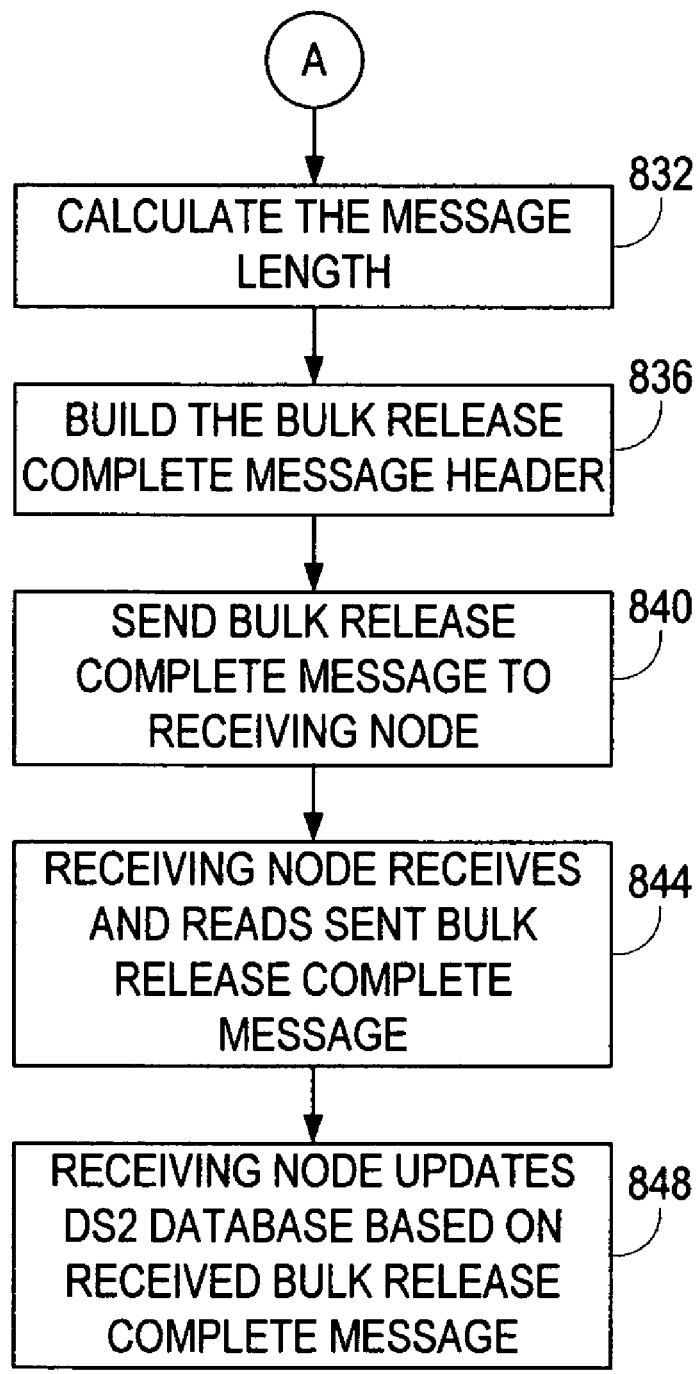

Referring to FIG. 7 and FIG. 8, a BR and BRC message are used to request release of more than one connection. The called party or the calling party issue the BR message and it is transmitted along the signaling path. In general, BR and BRC are exchanged between a node A and a node B to release a plural number of connections (although only 1 connection is also feasible) that go between node A and node B.

Referring specifically to FIG. 7, a node responds to an initiating event at block 704 by both clearing specific connections at the node, and building a BULK RELEASE message for those connections. The initiating event indicates a requirement for a clearing of a plural number of connections at a node. The initiating event may include, but is not limited to: a) a received Physical interface reset command, b) a received Virtual interface reset command, c) a received Datalink Layer Service-Specific Connection-Oriented Protocol (SSCOP) reset, d) a received Global path ATM Forum defined RESTART message, e) a received Virtual Path ATM Forum defined RESTART message, f) a received plural quantity of RELEASE messages (that may occur in response to a period of network congestion), and g) a received Force Reroute in a Semi-Permanent Switched Virtual Circuit (SPVC) based network.

In block 708, a specific transaction Identification is built for a peer node set of connections to be cleared. It is specifically contemplated that more than one transaction may be needed to clear a specific node to need connection set. For the specific peer node transaction being cleared, the node builds and adds the Transaction Identification 520 root to the database DS1 510 at block 712. For the specific peer node transaction being cleared, the node builds and adds the Transaction Identification 520 root to the database DS2 520 at block 716. For each connection to be cleared, in accordance with the initiating event, the node selects a connection for preparation of a List as shown at block 720 for a specific connection, in a loop that iterates for each connection. At block 724, the BLOCK RELEASE message record 328*i* is prepared for the connection being iterated, by setting each of the fields in a record 328*i* taught with reference to FIG. 3, specifically the Call Reference Length field 332*i*, the Call Reference Value field 334*a*, the Cause Location field 336*a*, and the Cause Value field 338*a* (with reference to record "a" in FIG. 3. At block 728, the prepared BR message record List 328*i* is appended to the payload 306. At block 732, connection data, including specifically the Call Reference Value 515 which is the preferred key index is added to the database DS1 510 in accordance with the Transaction Identification 520 root. At block 736, the at least connection identifier in the embodiment of the Call Reference Value 515 is added to the database DS2 510 including a pointer to the same connection in the database DS1 510, preferably by pointing to the transaction Identification 520 root in the database DS1 510. At block 740, the method illustrated with respect to blocks 720, 724, 728, 732, and 736 is repeated for a new connection, until a List has been prepared for each connection to be cleared by the BLOCK RELEASE message, and the records have been added to both the database DS1 510 and the database DS2 520.

At block 744, the number of Lists for insertion into the Number of Lists record 318 that is taught with reference to FIG. 3 is calculated. At block 748, the message length for insertion into the Message Length record 316 that is taught with reference to FIG. 3 is calculated by summing the size of each List built in blocks 724. At block 752 the BULK RELEASE message header 304 is built by setting the Protocol Discriminator record 308, the Transaction Identification record 310, the Message Identifier record 312, the Message Identifier record, the Compatibility Instruction Indicator record 314, and the Message Length record 316 taught below with reference to FIG. 3. At block 756, each connection included in the BR message is cleared from the node. A clearing has the same general meaning as for the conventional RELEASE message, generally involving freeing up resources on the node and informing peer node(s) that hold the same connection. At block 760, the built BULK RELEASE message is sent to a peer node across a signal path.

Referring to FIG. 8, at block 804, a node enabled to receive a Bulk Release message responds to the receipt of a BULK RELEASE message from a connected peer node by both clearing specific connections at the node, and building a BULK RELEASE COMPLETE message for those connections in succeeding acts. At block 808, for each List record in the received BULK RELEASE message, the node clears the connection in a loop that includes block 808, block 812, and block 816, and that iterates once through the loop for each connection. Each connection is preferably identified by the content of the Call Reference Value Field 334*i* in the List record. Each record contains data for a distinct connection to be cleared as taught with reference to FIGS. 3 and 5. At block 812, the BRC message record 428*i* is prepared for the connection being iterated, by setting each of the fields in the payload 406 taught with reference to FIG. 4, specifically the Call Reference Length field 432*i*, the Call Reference Value field 434*i*, the Cause Location field 436*a*, and the Cause Value field 438*a*. At block 816, the prepared BRC message record List 428*i* is appended to the payload 406. At block 820, the method illustrated with respect to blocks 808, 812, and 816 is repeated for a new connection, until each connection has been cleared and a List has been prepared and appended to the payload 806 for each cleared (or to be cleared, depending upon the embodiment) connection, and the prepared for connection to be cleared by the BULK RELEASE COMPLETE message.

At block 824, the Transaction Identification record 310 received in the BULK RELEASE message header is copied into the Correlation Identification record 410 of the BULK RELEASE COMPLETE message header 404. At block 828, the number of Lists for insertion into the Number of Lists record 418 is calculated. At block 832, the message length is calculated by adding the size of each List. At block 836, the BULK RELEASE COMPLETE message header 404 is built by setting the Correlation Identification record 410, the Compatibility Instruction Indicator record 414, the Message Length record 416, and the Number of Lists record 418 in the BULK RELEASE COMPLETE message header 404. At block 840, the BULK RELEASE COMPLETE message is sent to the peer node via the data link layer. At block 844, the peer node receives and reads the BULK RELEASE COMPLETE message. At block 848, the peer node deletes each connection record for the BULK RELEASE COMPLETE message from the database DS2 520, and updates a status record in the database DS1 510.

Now, referring again to FIG. 2, supposing again that the trunk that connects node 204 to node 206 is cut, so that each of the ten connections along path 1 should be released, node 204 can prepare and send a single BULK RELEASE message to router 202 (assuming that router 202 supports the BULK RELEASE message) containing the ten Lists that have the call reference of each of the ten connections along path 1 between node 204 and router 202. Node 204 clears the ten connections at node 204 along path 1 between node 204 and router 202, and router 202 upon receipt of the BULK RELEASE message clears the ten connections at router 202 along path 1 between router 202 and node 204, and prepares and sends a BULK RELEASE COMPLETE message to node 204.

Similarly, node 206 can prepare and send a single BULK RELEASE message to node 208 (assuming that node 208 supports the BULK RELEASE message) containing the ten Lists that have the call reference of each of the ten connections along path 1 between node 206 and node 208. Node 206 clears the ten connections at node 206 along path 1 between node 206 and node 208, and node 208 upon receipt of the BULK RELEASE message clears the ten connections at node 208 along path 1 between node 206 and node 208, and prepares and sends a BULK RELEASE COMPLETE message to node 206. Similarly, node 208 can prepare and send a single BULK RELEASE message to router 216 (assuming that router 216 supports the BULK RELEASE message) containing the ten Lists that have the call reference of each of the ten connections along path 1 between node 208 and router 216. Node 208 clears the ten connections at node 208 along path 1 between node 208 and router 216, and router 216 upon receipt of the BULK RELEASE message clears the ten connections at router 216 along path 1 between node 208 and router 216, and prepares and sends a BULK RELEASE COMPLETE message to node 208.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather a restrictive sense.

We claim:

1. A method comprising:
   clearing a plurality of first connections in bulk between a first node and a second node of an ATM network from the first node;
   for each said clearing, sending a first message from the first node to the second node, the first message comprising a single bulk release message from the first node to the second node containing an identification of the first connections, the identification comprising a list of connection identifiers allowing both of consecutive connection identifiers and non-consecutive connection identifiers;
   receiving the first message at the second node;
   clearing the first connections from the second node in response to the received first message;
   sending a single second message from the second node to the first node in response to the clearing of the first connections from the second node and receiving the first message identifying at least one of the connections cleared in response to the received first message, and the first message;
   the first node maintaining a database of at least one of a connections cleared and identified in the first message; and both
   a connections cleared and identified in the first message, and
   a connections cleared and identified in the first message but not identified in the second message; and
   the first node receiving the second message sent from the second node to the first node.

2. The method defined in claim 1 further including enabling an interpretation of the received first message wherein the clearing from the second node depends upon the enabling.

3. The method defined in claim 1 wherein each clearing defined in claim 1 has an associated distinct identification, and further the database uses as a root for the connections cleared and identified in each first message the distinct associated identification.

4. A method of clearing a plural number of connections between a first node and a second node in an Asynchronous Transfer Mode network including:
   sending at least one first message comprising a single bulk release message from the first node to the second node, wherein each first message comprises a list of connection identifiers allowing both of consecutive connection identifiers and non-consecutive connection identifiers, each first message including an identification of at least one of
   each of a plural number of first connections to be cleared in bulk from the second node by the first message, and
   each of a plural number of first connections that is one of cleared from the first node and to be cleared from the first node;
   for each said first message, clearing from the first node each said first connection;
   the first node placing into a first database a first record that includes an identification of each first connection cleared from the first node, and into a second database a second record that includes an identification of each first connection cleared from the first node;
   the second node receiving each first message;
   the second node clearing each of the first connections identified in each received first message;
   the second node sending a second message to the first node in response to each received first message that includes an identification of each connection that is one of cleared and to be cleared from the second node; and
   the first node in response to receiving each second message, deleting form the second database the identification of each connection identified in the second message.

5. The method defined in claim 4 wherein the first message is consistent with an Asynchronous Transfer Mode formatted message.

6. The method defined in claim 4 further including enabling the first node to send the first message before the sending.

7. The method defined in claim 4 wherein the sending is in response to a requirement for a clearing of a plural number of first node connections.

8. The method defined in claim 4 wherein the sending is in response to an event that includes at least one of:
- a received Physical interface reset command,
- a received Virtual interface reset command,
- a received Datalink Layer Service-Specific Connection-Oriented Protocol reset,
- a received Global path ATM Forum defined RESTART message,
- a received Virtual Path ATM Forum defined RESTART message,
- a received plural number of RELEASE messages, and
- a received Force Reroute in a Semi-Permanent Switched Virtual Circuit based network.

9. The method defined in claim 4 wherein the first message includes at least an identification of each of the first connections to be cleared from the second node, and further including:
- the second node receiving the first message, and
- the second node clearing each of the connections in the second node identified as to be cleared from the second node in the first message in response to receiving the first message.

10. The method defined in claim 9 further including enabling the second node to receive the first message before the receiving.

11. The method defined in claim 9 further including sending at least one of
- a connection message to the first node identifying the connections cleared by the second node in response to the second node receiving the first message, and
- an identification message to the first node identifying the first message received by the second node.

12. The method defined in claim 9 further including enabling the second node to send the first message before the sending.

13. The method defined in claim 4 further including the first node placing into a first database a record that includes an identification of each first connection cleared from the first node.

14. The method defined in claim 4 further including enabling the first node to receive the second message before the second node sending the second message.

15. The method defined in claim 4 wherein an index in each said first record includes the identification of a first connection.

16. The method defined in claim 4 wherein an index in each second record includes the identification of a first connection.

17. The method defined in claim 4 wherein a root of the first database is an identification of the first message.

18. The method defined in claim 4 wherein a root of the second database is an identification of the first message.

19. The method defined in claim 11 further including enabling the first node to receive the second message before the sending of a second message to the first node.

20. A computer-readable storage medium having instructions stored therein, which when executed by a computer, cause said computer to perform operations comprising:
- preparing at least one first message comprising a single bulk release message to be sent from a first node of an ATM network to a second node of an ATM network, each first message including an identification of a first connections to be cleared in bulk from the second node by the first message, the identification comprising a list of connection identifiers allowing both of consecutive connection identifiers and non-consecutive connection identifiers;
- for each said first message, clearing from the first node each said first connection;
- the first node placing into a first database a record that includes an identification of each first connection cleared from the first node, and into a second database a record that includes an identification of each first connection cleared from the first node;
- the first node interpreting a third message received from the second node after the first message is prepared that includes an identification of at least one connection; and
- the first node in response to interpreting each third message, deleting form the second database the identification of each of the connections identified in the third message.

21. The computer-readable storage medium of claim 20 wherein the operations further include the first node placing into a first database a record that includes an identification of each of the first connections cleared from the first node.

22. The computer-readable storage medium of claim 20, wherein the first message is consistent with an Asynchronous Transfer Mode formatted message.

23. The computer-readable storage medium of claim 20, wherein the operations further include interpreting a second message consistent with an Asynchronous Transfer Mode formatted message received from an ATM network node wherein the second message includes an identification of each of a plural number of connections to be cleared from the first node.

24. The computer-readable storage medium of claim 23, wherein the operations further include clearing each of the connections in the first node identified as to be cleared in the second message in response to interpreting the second message.

25. The computer-readable storage medium of claim 23, wherein the operations further include preparing at least one of
- a connection message to the ATM network node identifying the connections cleared by the first node in response to the first node interpreting the second message, and
- an identification message to the ATM network node identifying the second message received by the first node.

* * * * *